United States Patent
Dumas et al.

(10) Patent No.: US 9,870,472 B2
(45) Date of Patent: Jan. 16, 2018

(54) DETECTING MALIGN CODE IN UNUSED FIRMWARE MEMORY

(71) Applicant: Dell Products, L.P., Round Rock, TX (US)

(72) Inventors: Christopher C. Dumas, Round Rock, TX (US); Alaric Joaquim Narcissius Silveira, Austin, TX (US); Lisa B. Treweek, Lakeway, TX (US)

(73) Assignee: Dell Products, L.P., Round Rock, TX (US)

( * ) Notice: Subject to any disclaimer, the term of this patent is extended or adjusted under 35 U.S.C. 154(b) by 155 days.

(21) Appl. No.: 14/944,296

(22) Filed: Nov. 18, 2015

(65) Prior Publication Data

US 2017/0140149 A1    May 18, 2017

(51) Int. Cl.
  *G06F 21/00* (2013.01)
  *G06F 21/56* (2013.01)
  *G06F 3/06* (2006.01)

(52) U.S. Cl.
  CPC ............ *G06F 21/56* (2013.01); *G06F 3/0623* (2013.01); *G06F 3/0653* (2013.01); *G06F 3/0679* (2013.01)

(58) Field of Classification Search
  CPC ...... G06F 21/56; G06F 3/0679; G06F 3/0653; G06F 3/0623
  See application file for complete search history.

(56) References Cited

U.S. PATENT DOCUMENTS

| | | | |
|---|---|---|---|
| 2015/0205527 A1* | 7/2015 | Cohen | G11C 29/52 711/103 |
| 2015/0301933 A1* | 10/2015 | Tuers | G06F 12/0246 714/773 |

* cited by examiner

*Primary Examiner* — Mahfuzur Rahman
(74) *Attorney, Agent, or Firm* — Fogarty LLP

(57) ABSTRACT

Systems and methods for preventing attachment of malign code to unused firmware memory are described. In some embodiments, an Information Handling System (IHS) may include a processor and a memory coupled to the processor, the memory having program instructions stored thereon that, upon execution by the processor, cause the IHS to: read contents of a non-volatile memory (NVM); and determine that the NVM does not include malign code stored thereon, at least in part, by determining that selected memory locations in the NVM where firmware is not stored contain pre-determined values.

10 Claims, 4 Drawing Sheets

DETECTING MALIGN CODE IN UNUSED FIRMWARE MEMORY

FIELD

This disclosure relates generally to computer systems, and more specifically, to systems and methods for preventing attachment of malign code to unused firmware memory.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs are typically built from a variety of components that cooperate to process information. For example, a Central Processing Unit (CPU) runs applications to perform desired operations, such as word processing, multimedia content presentation, web browsing and e-mail. End users interact with applications through a variety of auxiliary subsystems built from the components. Auxiliary subsystems input information for use by the applications and present information processed by the applications. Some examples of auxiliary subsystems include a video subsystem that processes information to generate visual image information for presentation at a display, storage subsystems that support communications with storage devices such as hard disk drives and optical drives, and network subsystems that support communications with various different types of networks.

IHSs typically coordinate the various interactions among applications running on a CPU and physical components with an Operating System (OS) that also runs on the CPU. In addition, IHSs generally have a system boot and initialization firmware architecture that provides the OS with access to physical components, such as a Basic Input/Output System (BIOS).

The BIOS is a set of firmware instructions that runs on a physical component generally referred to as a chipset. During initialization of an IHS, the BIOS coordinates a boot of the OS from persistent storage, such as a hard disk drive, to an operational state running on the CPU and also typically stored in Random Access Memory (RAM) interfaced with the CPU. In addition to the BIOS, other firmware instructions are typically included to support operation of auxiliary subsystems.

For example, Option Read-Only Memories (OPROMs) are autonomous pieces of firmware which control the boot and configuration of auxiliary subsystems within a platform and in some instances also serve as runtime code for some types of subsystems. A video OPROM is typically loaded early in boot to coordinate operations of the video subsystem with the main BIOS and OS so that information can be presented on a display. Other examples include storage OPROMs that make storage devices visible to other components during boot, and network boot OPROMs that support boot of the IHS from a network interface.

A problem with conventional IHSs is that malign code executing on a physical component can compromise information stored on an IHS and can even lead to failure of the IHS. Although malicious code is most commonly targeted at applications and OSs running on an IHS, successful attacks by malicious code on an IHS's firmware present a high risk because firmware runs at a more privileged level than most anti-malware tools available today. In many cases, once additional malign code is attached to a firmware device (e.g., by a remote user), that firmware vector may be used to gain access to server and client systems.

SUMMARY

Embodiments of systems and methods for preventing attachment of malign code to unused firmware memory are described herein. In an illustrative, non-limiting embodiment, an Information Handling System (IHS) may include: a processor and a memory coupled to the processor, the memory having program instructions stored thereon that, upon execution by the processor, cause the IHS to: read contents of a non-volatile memory (NVM); and determine that the NVM does not include malign code stored thereon, at least in part, by determining that selected memory locations in the NVM where firmware is not stored contain pre-determined values.

To read contents of the NVM, the program instructions may cause the IHS to: identify a memory fill pattern, the memory fill pattern indicating all memory locations in the NVM where firmware is stored; and identify all blank memory locations based upon the memory fill pattern, the blank memory locations corresponding to all memory locations in the NVM where firmware is not stored.

The program instructions may also cause the IHS to: choose the selected memory locations as a random subset of all blank memory locations. The program instructions may further cause the IHS to: update the firmware stored in the NVM; calculate an updated memory fill pattern that indicates all memory locations in the NVM where the updated firmware is stored; and identify all current blank memory locations based upon the updated memory fill pattern, the current blank memory locations corresponding to all memory locations in the NVM where the updated firmware is not stored.

To determine that selected memory locations in the NVM where firmware is not stored contain pre-determined values, the program instructions may cause the IHS to: read a series of values stored in the selected memory locations; decrypt the series of values into a sequence; and compare sequence to an expected sequence.

In some cases, the NVM may be part of a device manufactured by a third-party vendor. The pre-determined values may be derived, at least in part, using an encryption key or hash algorithm unknown to the third-party vendor. For example, the pre-determined values may be calculated by a manufacturer of the IHS using the encryption key or hash algorithm, and provided to the third-party vendor prior to the device being shipped from the third-party vendor to the manufacturer of the IHS.

The pre-determined values may be stored in the NVM by the third-party vendor prior to the firmware being stored in the NVM overwriting a portion of the pre-determined values. Moreover, the firmware may be stored in non-contiguous areas of the NVM such that a subset of the pre-determined values is found between two of the non-contiguous areas.

In another illustrative, non-limiting embodiment, a memory device may have program instructions stored thereon that, upon execution by a processor of an IHS, cause the IHS to: write a series of pre-determined values onto an NVM of a device to be provided to an IHS manufacturer by a third-party vendor, wherein the series of pre-determined values is provided to the third-party vendor by the IHS manufacturer; and store firmware onto the NVM by overwriting at a least a portion of memory locations of the NVM containing the predetermined values.

The series of pre-determined values may be calculated by the IHS manufacturer, at least in part, using an encryption key or hash algorithm unknown to the third-party vendor. The firmware may be stored in non-contiguous areas of the NVM such that a subset of the series of pre-determined values is found between two of the non-contiguous areas. And the program instructions may also cause the IHS to: compute a memory fill pattern for the NVM that indicates all memory locations of the NVM where firmware is expected to be stored; and provide the memory fill pattern to the IHS manufacturer.

The memory fill pattern may enable the IHS manufacturer to: read a portion of the series of pre-determined values stored in memory locations of the NVM where firmware is not expected to be stored; decrypt the portion of the series of pre-determined values into a sequence; and determine whether the firmware has been altered based upon a comparison between the sequence and a seed sequence.

In yet another illustrative, non-limiting embodiment, a memory device may have program instructions stored thereon that, upon execution by a processor of an IHS, cause the IHS to: create a data pattern; encode the data pattern; and transmit the encoded data pattern to a third party vendor, wherein the third party vendor is configured to: write the encoded data pattern onto an NVM of a device to be provided by the third-party vendor to a IHS manufacturer; and store firmware onto the NVM by overwriting at a least a portion of memory locations of the NVM containing the encoded data pattern.

The encoded data pattern may be calculated by the IHS manufacturer, at least in part, using an encryption key or hash algorithm unknown to the third-party vendor. The firmware may be stored in non-contiguous areas of the NVM such that a subset of the encoded data pattern is found between two of the non-contiguous areas.

The program instructions may cause the IHS to: compute a memory fill pattern for the NVM that indicates all memory locations of the NVM where firmware is stored; and identify all blank memory locations based upon the memory fill pattern, the blank memory locations corresponding to all memory locations in the NVM where the firmware is not stored. The program instructions may also cause the IHS to: read at least a portion of the encoded data pattern stored in the blank memory locations; decrypt the portion of the encoded data pattern into a sequence; compare sequence to an expected sequence; and determine whether the firmware has been altered based upon the comparison.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below with respect to FIG. 2.

Figure 1:
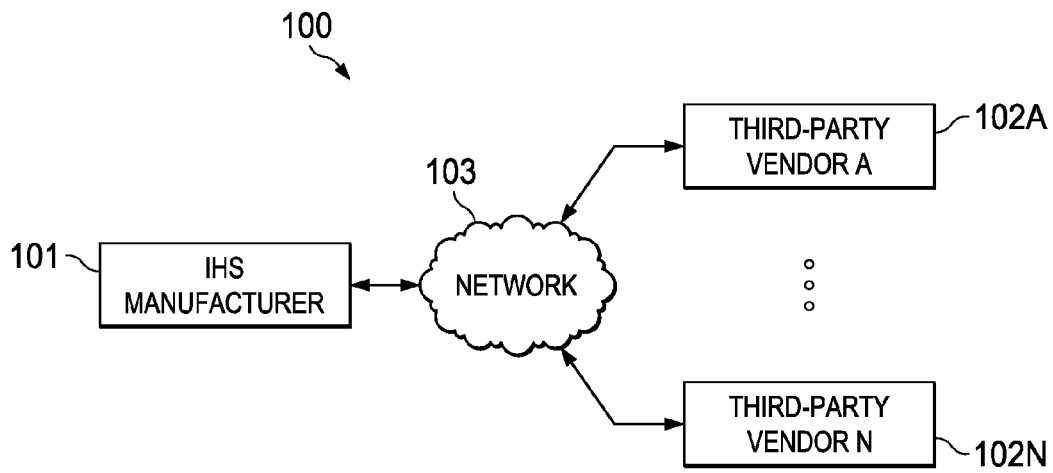
FIG. 1 is a block diagram of an example of an environment where systems and methods described herein may be implemented, according to some embodiments.

FIG. 1 shows an environment where systems and methods described herein may be implemented, according to some embodiments. Particularly, environment 100 includes IHS manufacturer 101 and a plurality of third-party vendors 102A-N communicatively coupled to each other via network 103. In various implementations, IHS manufacturer 101 and third-party vendors 102A-N are entirely distinct business entities. For instance, manufacturer 101 may be Dell, Inc.®, whereas vendors 102A-N may include any electronics manufacturer that makes parts or components (e.g., video card adaptors, network cards, storage devices, etc.) that are configured to be coupled to an IHS.

In operation, network 103 may be employed so that IHS manufacturer 101 may create and transmit encoded patterns to be stored within the non-volatile memories of devices provided to IHS manufacturer 101 by third-party vendors 102A-N. An original pattern of data may be created by IHS manufacturer 101 using a mathematical function and/or an encryption mechanism. The math function may create randomized values in a manner sufficiently to make deciphering a encryption key difficult. For example, in some cases the math function may be a Fibonacci sequence, which may then be hashed to increase the level of randomization. This calculated pattern is then encoded by a stream encryption algorithm or other suitable encryption algorithm. The encoded pattern is then sent to a given third-party vendor 102A.

Third-party vendor 102A applies the encoded pattern to a firmware component of one of its devices by loading the previously encoded pattern in a non-volatile memory (NVM) of the device and then loading the actual firmware code over the active portions of the NVM. The encoded pattern is therefore present in all the unused areas of the NVM (also referred to as "blank" areas; despite it being filled with the underlying encoded pattern). Note that the unused memory areas need not be contiguous, and thus unused random locations and unused sectored memory still contain the encoded pattern.

Once the device is installed in an IHS by IHS manufacturer 101, the IHS manufacturer may request a random sample or complete review of memory locations from the known unused portion of the device's NVM. The IHS manufacturer 101, with knowledge of the encryption and hashing mechanism, can then predict the proper value for the memory location(s). Malign code, however, cannot predict the contents of these memory location(s) without knowledge of the encryption key, and thus cannot not calculate the expected values for those location(s). Furthermore, because in some cases all the unused NVM contains the encoded pattern, the malign code cannot maintain a big enough copy of that pattern for spoofing purposes.

In many embodiments, these techniques may be adaptable to update schemes involving more than one revision of firmware. For example, a new firmware's unused memory may be encrypted with a different key than the older version to prevent a malign process from using the pattern in one NVM to spoof readings of another NVM. Therefore, in contrast with conventional approaches for dealing with malign code, the systems and methods described herein allow filling the device with a previously generated pattern that eliminates exposure of encryption keys to third parties, using the filled pattern to detect malign code, and/or eliminating the malign code's ability to spoof the requesting verification mechanism.

Figure 2:
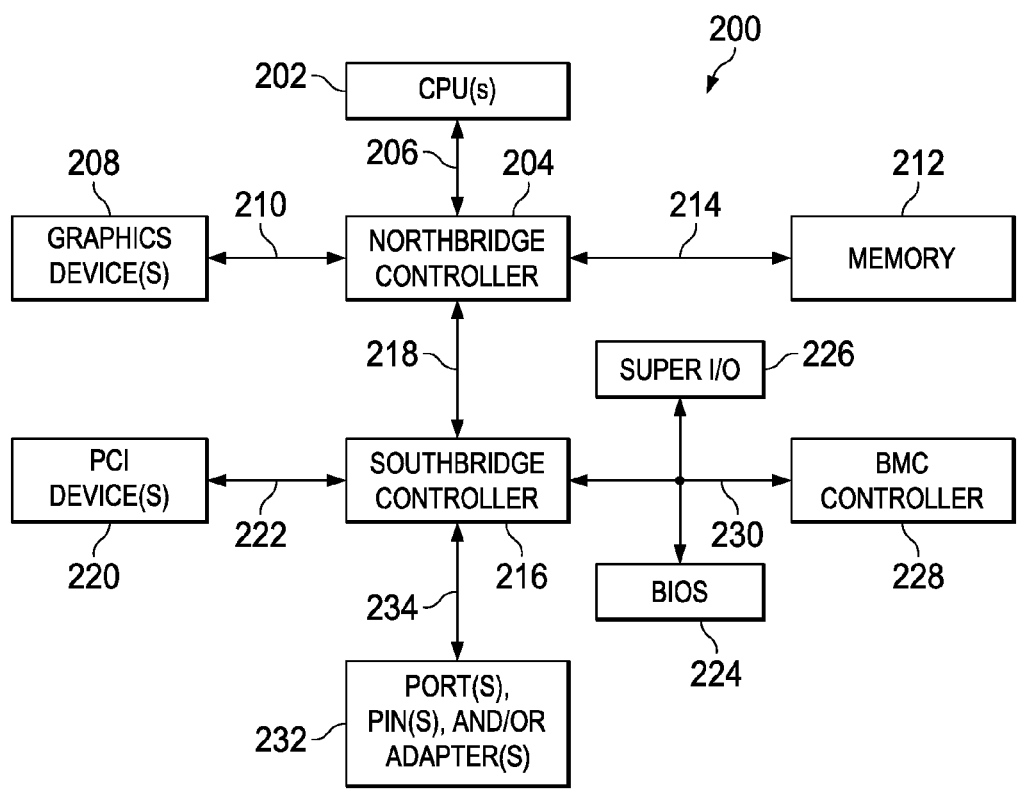
FIG. 2 is a block diagram of an example of an Information Handling System (IHS), according to some embodiments.

FIG. 2 is a block diagram an example of IHS 200 which may be used to implement a system for preventing attachment of malign code to unused firmware memory. As shown, IHS 200 includes one or more CPUs 202. In various embodiments, IHS 200 may be a single-processor system including one CPU 202, or a multi-processor system including two or more CPUs 202 (e.g., two, four, eight, or any other suitable number). CPU(s) 202 may include any processor capable of executing program instructions. For example, in various embodiments, CPU(s) 202 may be general-purpose or embedded processors implementing any of a variety of instruction set architectures (ISAs), such as the x86, POWERPC, ARM, SPARC, or MIPS ISAs, or any other suitable ISA. In multi-processor systems, each of CPU(s) 202 may commonly, but not necessarily, implement the same ISA. In an embodiment, a motherboard (not shown) may be configured to provide structural support, power, and electrical connectivity between the various components illustrated in FIG. 2.

CPU(s) 202 are coupled to northbridge controller or chipset 204 via front-side bus 206. Northbridge controller 204 may be configured to coordinate I/O traffic between CPU(s) 202 and other components. For example, in this particular implementation, northbridge controller 204 is coupled to graphics device(s) 208 (e.g., one or more video cards or adaptors, etc.) via graphics bus 210 (e.g., an Accelerated Graphics Port or AGP bus, a Peripheral Component Interconnect or PCI bus, etc.). Northbridge controller 204 is also coupled to system memory 212 via memory bus 214. Memory 212 may be configured to store program instructions and/or data accessible by CPU(s) 202. In various embodiments, memory 212 may be implemented using any suitable memory technology, such as static RAM (SRAM), synchronous dynamic RAM (SDRAM), nonvolatile/Flash-type memory, or any other type of memory.

Northbridge controller 204 is coupled to southbridge controller or chipset 216 via internal bus 218. Generally, southbridge controller 216 may be configured to handle various of IHS 200's I/O operations, and it may provide interfaces such as, for instance, Universal Serial Bus (USB), audio, serial, parallel, Ethernet, etc., via port(s), pin(s), and/or adapter(s) 232 over bus 224. For example, southbridge controller 216 may be configured to allow data to be exchanged between IHS 200 and other devices, such as other IHSs attached to a network. In various embodiments, southbridge controller 216 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 216 may also enable connection to one or more keyboards, keypads, touch screens, scanning devices, voice or optical recognition devices, or any other devices suitable for entering or retrieving data. Multiple I/O devices may be present in IHS 200. In some embodiments, I/O devices may be separate from IHS 200 and may interact with IHS 200 through a wired or wireless connection. As shown, southbridge controller 216 is further coupled to one or more PCI devices 220 (e.g., modems, network cards, sound cards, video cards, etc.) via PCI bus 222, including, for example, self-encrypting Hard Disk Drives (HDDs) or Solid State Drives (SSDs). Southbridge controller 216 is also coupled to Basic I/O System (BIOS) 224, Super I/O Controller 226, and Baseboard Management Controller (BMC) 228 via Low Pin Count (LPC) bus 220.

BIOS 224 includes non-volatile memory having program instructions stored thereon. Those instructions may be usable CPU(s) 202 to initialize and test other hardware components and/or to load an Operating System (OS) onto IHS 200. As such, BIOS 224 may include an interface that allows CPU(s) 202 to load and execute certain firmware. In some cases, such firmware may include program code that is compatible with the Unified Extensible Firmware Interface (UEFI) specification, although other types of firmware may be used.

BMC controller 228 may include non-volatile memory having program instructions stored thereon that are usable by CPU(s) 202 to enable remote management of IHS 200. For example, BMC controller 228 may enable a user to discover, configure, and manage BMC controller 228, setup configuration options, resolve and administer hardware or software problems, etc. Additionally or alternatively, BMC controller 228 may include one or more firmware volumes, each volume having one or more firmware files used by the BIOS' firmware interface to initialize and test components of IHS 200.

Super I/O Controller 226 combines interfaces for a variety of lower bandwidth or low data rate devices. Those devices may include, for example, floppy disks, parallel ports, keyboard and mouse, temperature sensor and fan speed monitoring, etc.

In some cases, IHS 200 may be configured to access different types of computer-accessible media separate from memory 212. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 200 via northbridge controller 204 and/or southbridge controller 216.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 204 may be combined with southbridge controller 216, and/or be at least partially incorporated into CPU(s) 202. In other implementations, one or more of the devices or components shown in FIG. 3 may be absent, or one or more other components may be added. Accordingly, systems and methods described herein may be implemented or executed with other computer system configurations.

A person of ordinary skill will recognize that IHS 200 of FIG. 2 is only one example of a system in which the certain embodiments may be utilized. Indeed, the embodiments described herein may be used in various electronic devices, such as network router devices, televisions, custom telecommunications equipment for special purpose use, etc. That is, certain techniques described herein are in no way limited to use with the computer system of FIG. 2.

Figure 3:
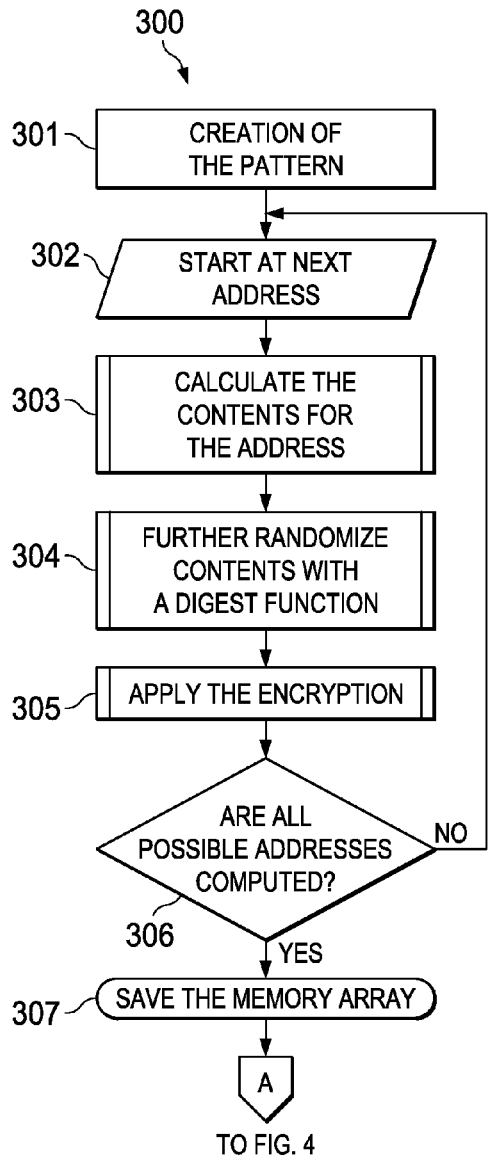
FIG. 3 is a flowchart of an example of a method for creating a pattern by an IHS manufacturer, according to some embodiments.

FIG. 3 is a flowchart of an example of a method for creating a pattern by an IHS manufacturer, according to some embodiments. Particularly, method 300 starts at block 301. At block 302, method 300 starts at the next NVM memory address (the first time block 302 is executed, the next address is the first address). At block 303, method 300 may calculate contents or values for that NVM memory address, for example, using a randomizing function, math sequence, etc. At block 304, method 300 may further randomize the contents with a hash or digest function, or the like. Then, at block 305, method 300 applies the encryption to the randomized contents using an encryption key.

At block 306, method 300 determines whether all possible NVM memory addresses have been computed. If not, control passes to block 302 and values are calculated for the next address. Otherwise, values for all NVM memory locations are stored, for example, in the form of an array.

As such, IHS manufacturer 101 may use method 300 to calculate or create a data pattern for each memory location of an NVM of a device being manufactured or shipped by a third-party vendor. The data pattern is encoded, for example, using a hash and/or with encryption. The functions and/or keys used in this process are not shared with the third-party vendor, who only receives this pre-calculated, already encoded data pattern, and then proceeds with method 400 described in FIG. 4.

Figure 4:
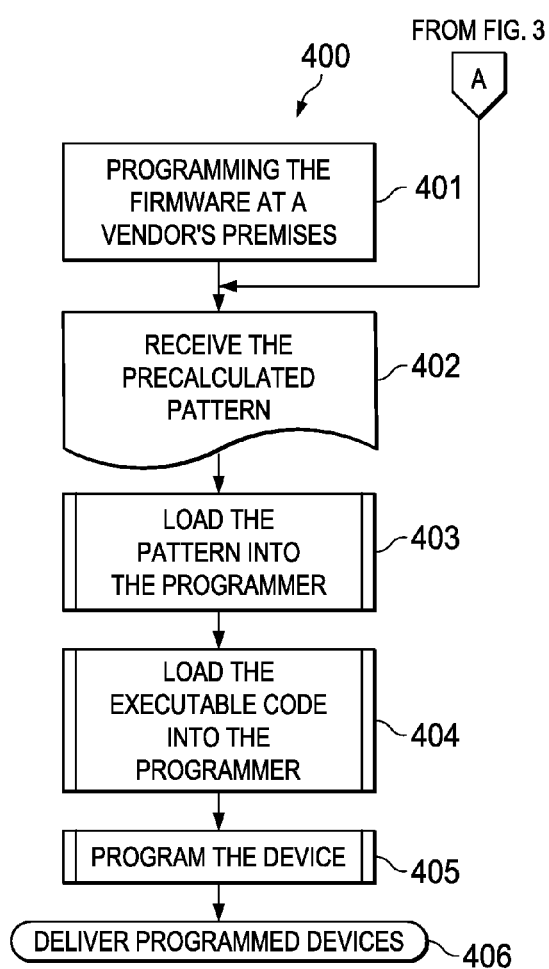
FIG. 4 is a flowchart of an example of a method for programming a non-volatile memory (NVM) by a third-party vendor, according to some embodiments.

FIG. 4 is a flowchart of an example of a method for programming an NVM by a third-party vendor, according to some embodiments. Specifically, method 400 starts at block 401. At block 402, method 400 receives the pre-calculated, encoded data pattern from IHS manufacturer 101. At block 403, method 400 loads the pattern onto a programmer—e.g., an IHS coupled to the device being programmed. At block 404, method 400 loads executable firmware code onto the programmer. Then, at block 405, method 400 programs the device, and at block 406 the third-party vendor delivers the programmed device to IHS manufacturer 101.

In some cases, at block 403, the pattern may be written in every memory location of the NVM, and the firmware may overwrite at least a portion of that pattern at block 404. In other cases, the programmer may combine the pattern with the firmware beforehand in order to achieve similar results with a single write operation. It should be noted that, in many situations, the firmware may be stored in non-contiguous areas of the NVM such that a portion of the pattern is found between any two of the non-contiguous areas.

Figure 5:
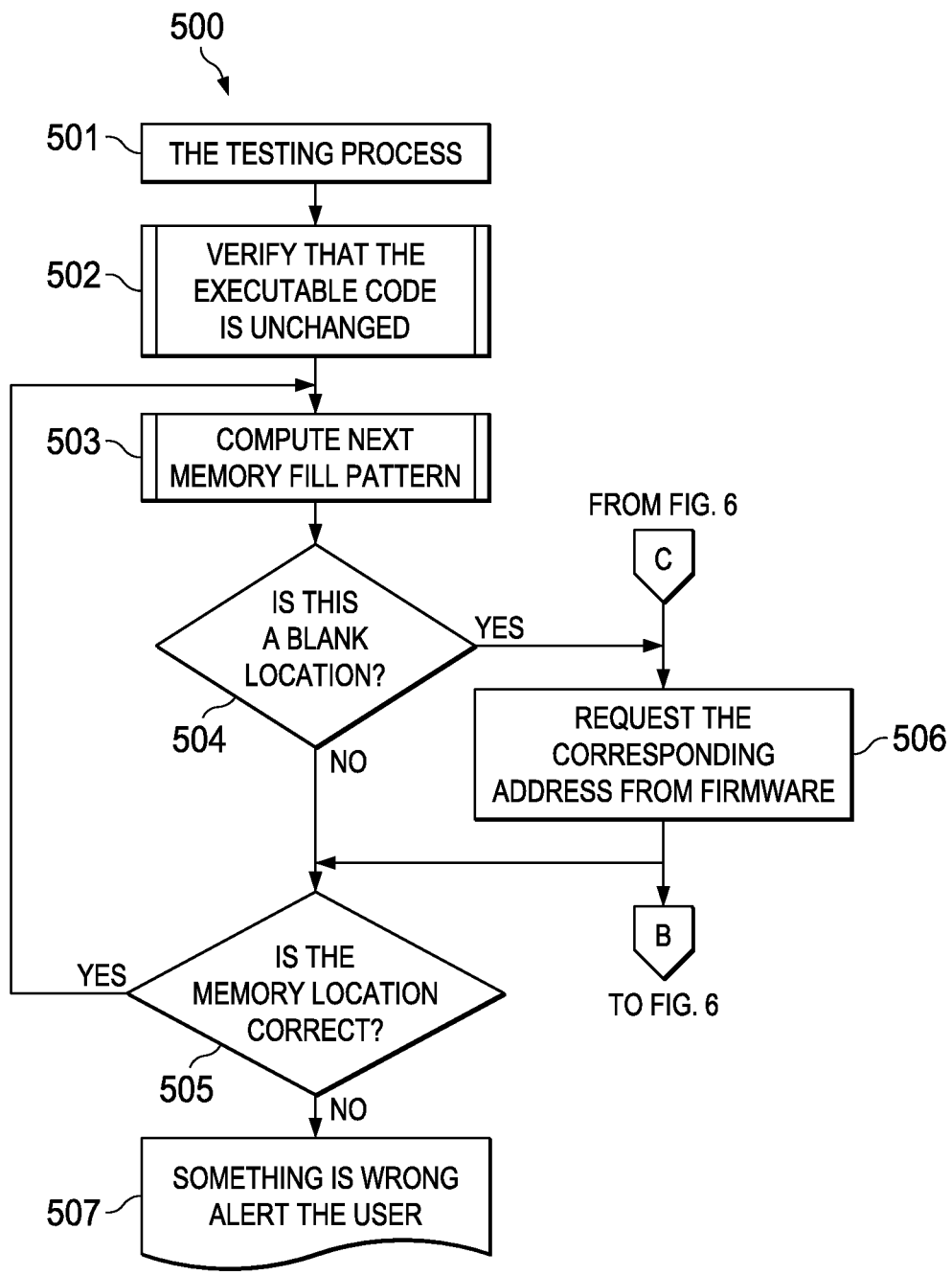
FIG. 5 is a flowchart of an example of a method for testing an NVM from the perspective of a host IHS, according to some embodiments.

Once the device is received by IHS manufacturer 101, it may employ a host IHS to test the device and/or another IHS with the device coupled thereto. To that end, FIG. 5 is a flowchart of an example of a method for testing an NVM from the perspective of a host IHS, according to some embodiments. Method 500 begins at block 501. At block 502, method 500 verifies that the executable code in the NVM is unchanged. At block 503, method 500 computes an NVM memory fill pattern based upon an examination of the NVM. Additionally or alternatively, the memory fill pattern may be received from the third-party vendor.

Based upon the memory fill pattern, block 504 may determine whether the memory location at issue is a blank location; that is, a location where firmware is not (or is not expected to be) stored in the NVM, therefore that location should still be storing a portion of the encoded pattern. If the location is not blank—that is, it stores firmware—control returns to block 503. Otherwise, if the location is blank, method 500 reads a corresponding address from the NVM memory. Block 505 then evaluates whether the address holds a value matching the value expected by IHS manufacturer 101. If so, control returns to block 503. Otherwise, the user may be alerted at block 507 that malign code may be present in the NVM.

Figure 6:
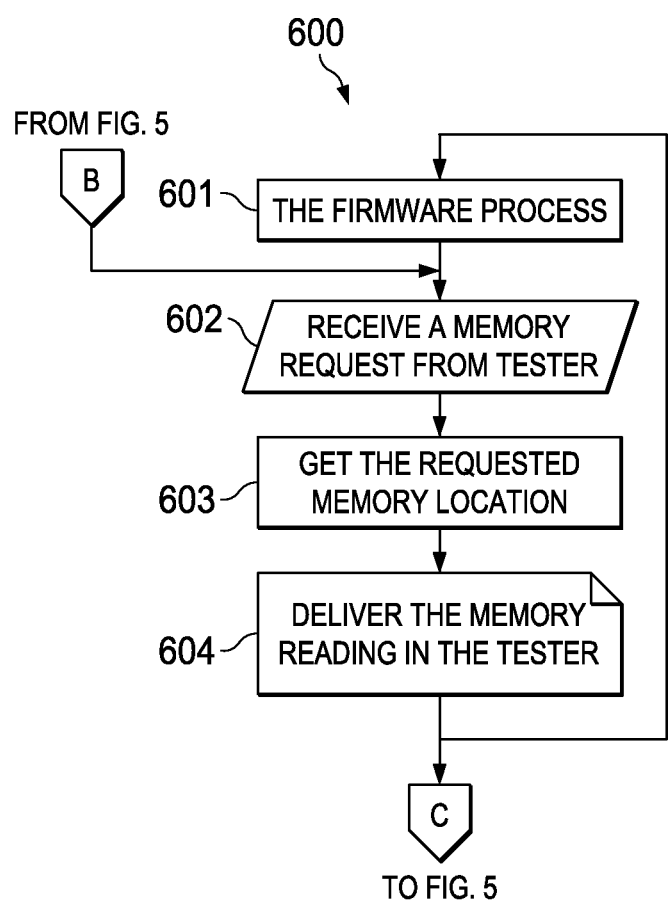
FIG. 6 is a flowchart of an example of a method for testing an NVM from the perspective of a firmware device, according to some embodiments.

FIG. 6 is a flowchart of an example of a method for testing an NVM from the perspective of a firmware device, according to some embodiments. Method 600 starts a block 601, and at block 602 the NVM device receives a memory request from the host IHS. At block 603, method 600 retrieves the value stored in the location specified in the memory request. Then, at block 604, method 600 delivers the retrieved value to the host IHS.

In various embodiments, a tester or host IHS may read contents of an NVM device (e.g., of a motherboard component, peripheral component, etc.) and determine that the NVM does not include malign code stored thereon, at least in part, by determining that selected memory locations in the NVM where firmware is not stored contain pre-determined values. These pre-determined values are encoded using a method and/or key known to the IHS manufacturer, but not to the third-party vendor providing the NVM device. The third-party vendor writes the pre-determined values received from the IHS manufacturer in the NVM, and then overwrites a portion of those values with firmware.

When the IHS manufacturer receives the device containing the NVM from the third-party vendor, it also receives or generates a memory fill map or pattern for the NVM, which indicates the locations where the firmware is stored. To determine whether malign code has been installed in the NVM, the IHS manufacturer may read portions of the NVM that are not expected to contain firmware (and thus should instead include the pre-determined values), and it may evaluate whether the pattern of values found in those blank portions match the expected values. If so, then malign code was not found. Otherwise, a user may be alerted to the possibility that malign code has infiltrated the NVM. In many implementations, checking whether the firmware in the NVM is intact may be performed by an end-user to whom the IHS manufacturer provides the NVM device or IHS including that device.

In some cases the firmware may be updated through a legitimate process; that is, although the originally installed firmware has been modified, it still does not include malign code. In those cases, a host IHS may update the firmware stored in the NVM, calculate or receive an updated memory fill pattern that indicates all memory locations in the NVM where the updated firmware is stored, and identify all current blank memory locations based upon the updated memory fill pattern, the current blank memory locations corresponding to all memory locations in the NVM where the updated firmware is not stored. Prior to updating the firmware, the host IHS may generate another data pattern using a different match function and/or encryption key, and the process of FIG. 4 may be repeated (by a third-party vendor, IHS manufacturer, or end-user).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution by the processor, cause the IHS to:
      receive a command from a user to check whether firmware stored in a non-volatile memory (NVM) is intact;
      read contents of the NVM;
      identify a memory fill pattern, the memory fill pattern indicating all memory locations in the NVM where firmware is stored;
      identify all blank memory locations based upon the memory fill pattern, the blank memory locations corresponding to all memory locations in the NVM where firmware is not stored;
      determine that the NVM does not include malign code stored thereon, at least in part, by: choosing selected memory locations as a random subset of all blank memory locations; and determining that selected memory locations in the NVM where firmware is not stored contain pre-determined values; and
      notify the user of whether the firmware is intact based, at least in part, upon the determination.

2. The IHS of claim 1, wherein the program instructions, upon execution, further cause the IHS to:
   update the firmware stored in the NVM;
   calculate an updated memory fill pattern that indicates all memory locations in the NVM where the updated firmware is stored; and
   identify all current blank memory locations based upon the updated memory fill pattern, the current blank memory locations corresponding to all memory locations in the NVM where the updated firmware is not stored.

3. A memory device having program instructions stored thereon that, upon execution by a processor of an Information Handling System (IHS), cause the IHS to:
   write a series of pre-determined values onto a non-volatile memory (NVM) of a device to be provided to an IHS manufacturer by a third-party vendor, wherein the series of pre-determined values is provided to the third-party vendor by the IHS manufacturer;

store firmware onto the NVM by overwriting at a least a portion of memory locations of the NVM containing the predetermined values;

compute a memory fill pattern for the NVM that indicates all memory locations of the NVM where firmware is expected to be stored; and provide the memory fill pattern to the IHS manufacturer, wherein the memory fill pattern enables the IHS manufacturer to:

receive a command from a user to check whether the firmware is intact;

read a portion of the series of pre-determined values stored in memory locations of the NVM where firmware is not expected to be stored;

decrypt the portion of the series of pre-determined values into a sequence;

determine whether the firmware has been altered based upon a comparison between the sequence and a seed sequence; and notify the user of whether the firmware is intact based, at least in part, upon the determination.

4. The memory device of claim 3, wherein the series of pre-determined values is calculated by the IHS manufacturer, at least in part, using an encryption key or hash algorithm unknown to the third-party vendor.

5. The memory device of claim 3, wherein the firmware is stored in non-contiguous areas of the NVM such that a subset of the series of pre-determined values is found between two of the non-contiguous areas.

6. A memory device having program instructions stored thereon that, upon execution by a processor of an Information Handling System (IHS), cause the IHS to:

create a data pattern;

encode the data pattern; and transmit the encoded data pattern to a third party vendor, wherein the third party vendor is configured to:

write the encoded data pattern onto a non-volatile memory (NVM) of a device to be provided by the third-party vendor to an IHS manufacturer;

store firmware onto the NVM by overwriting at least a portion of memory locations of the NVM containing the encoded data pattern;

compute a memory fill pattern for the NVM that indicates all memory locations of the NVM where firmware is stored;

identify all blank memory locations based upon the memory fill pattern, the blank memory locations corresponding to all memory locations in the NVM where the firmware is not stored;

receive a command from a user to check whether the firmware is intact;

read at least a portion of the encoded data pattern stored in the blank memory locations;

decrypt the portion of the encoded data pattern into a sequence;

compare sequence to an expected sequence;

determine whether the firmware has been altered based upon the comparison; and notify the user of whether the firmware is intact based, at least in part, upon the determination.

7. The memory device of claim 6, wherein the encoded data pattern is calculated by the IHS manufacturer, at least in part, using an encryption key or hash algorithm unknown to the third-party vendor.

8. The memory device of claim 6, wherein the firmware is stored in non-contiguous areas of the NVM such that a subset of the encoded data pattern is found between two of the non-contiguous areas.

9. An Information Handling System (IHS), comprising:

a processor; and a memory coupled to the processor, the memory having program instructions stored thereon that, upon execution by the processor, cause the IHS to:

receive a command from a user to check whether the firmware is intact;

read contents of a non-volatile memory (NVM);

identify a memory fill pattern, the memory fill pattern indicating all memory locations in the NVM where firmware is stored;

identify all blank memory locations based upon the memory fill pattern, the blank memory locations corresponding to all memory locations in the NVM where firmware is not stored;

determine that the NVM does not include malign code stored thereon, at least in part, by determining that selected memory locations in the NVM where firmware is not stored contain pre-determined values, wherein to determine that selected memory locations in the NVM where firmware is not stored contain pre-determined values, the program instructions, upon execution, further cause the IHS to: read a series of values stored in the selected memory locations; decrypt the series of values into a sequence; and compare the sequence with an expected sequence; and notify the user of whether the firmware is intact based, at least in part, upon the determination.

10. An Information Handling System (IHS), comprising:

a processor; and a memory coupled to the processor, the memory having program instructions stored thereon that, upon execution by the processor, cause the IHS to:

read contents of a non-volatile memory (NVM), wherein the NVM is part of a device manufactured by a third-party vendor;

identify a memory fill pattern, the memory fill pattern indicating all memory locations in the NVM where firmware is stored;

identify all blank memory locations based upon the memory fill pattern, the blank memory locations corresponding to all memory locations in the NVM where firmware is not stored;

receive a command from a user to check whether the firmware is intact;

determine that the NVM does not include malign code stored thereon, at least in part, by determining that selected memory locations in the NVM where firmware is not stored contain pre-determined values, wherein the pre-determined values are derived, at least in part, using an encryption key or hash algorithm unknown to the third-party vendor, wherein the pre-determined values are calculated by a manufacturer of the IHS using the encryption key or hash algorithm, wherein the pre-determined values are provided to the third-party vendor prior to the device being shipped from the third-party vendor to the manufacturer of the IHS, wherein the pre-determined values are stored in the NVM by the third-party vendor prior to the firmware being stored in the NVM overwriting a portion of the pre-determined values, and wherein the firmware is stored in non-contiguous areas of the NVM such that a subset of the pre-determined values is found between two of the non-contiguous areas; and notify the user of whether the firmware is intact based, at least in part, upon the determination.

\* \* \* \* \*